US008687238B2

(12) United States Patent
Gondek et al.

(10) Patent No.: US 8,687,238 B2
(45) Date of Patent: Apr. 1, 2014

(54) DETERMINE MODIFIED PRINTER PROFILE BY SELECTIVELY CHANGING COLOR SATURATION TO BALANCE INK USAGE

(75) Inventors: Jay S Gondek, Camas, WA (US); Jefferson P. Ward, Brush Prairie, WA (US); Jason M Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 13/255,371

(22) PCT Filed: Apr. 30, 2009

(86) PCT No.: PCT/US2009/042302
§ 371 (c)(1),
(2), (4) Date: Sep. 8, 2011

(87) PCT Pub. No.: WO2010/126515
PCT Pub. Date: Nov. 4, 2010

(65) Prior Publication Data
US 2011/0317188 A1 Dec. 29, 2011

(51) Int. Cl.

| | |
|---|---|
| ***H04N 1/50*** | (2006.01) |
| ***H04N 1/60*** | (2006.01) |
| ***G06K 15/02*** | (2006.01) |
| ***B41J 2/175*** | (2006.01) |
| ***B41J 2/21*** | (2006.01) |

(52) U.S. Cl.
USPC .......... 358/3.24; 358/502; 358/504; 358/520; 347/6; 347/14

(58) Field of Classification Search
USPC ............... 358/1.9, 3.24, 3.27, 1.13, 501, 502, 358/504, 518, 520, 530; 347/5, 6, 14, 19
See application file for complete search history.

(56) References Cited

U.S. PATENT DOCUMENTS

| | | | |
|---|---|---|---|
| 5,659,333 | A | 8/1997 | Okishima |
| 5,792,380 | A | 8/1998 | Wen et al. |

(Continued)

FOREIGN PATENT DOCUMENTS

| | | | |
|---|---|---|---|
| EP | 0606022 | A | 7/1994 |
| EP | 0803360 | A2 | 10/1997 |

(Continued)

OTHER PUBLICATIONS

Supplememtal EP Search Report ~ dated Oct. 1, 2012 ~ Application No. 09844170.-1251/2424731 (PCT/US2009/042302).

(Continued)

*Primary Examiner* — Scott A Rogers
(74) *Attorney, Agent, or Firm* — Victor DeVito

(57) ABSTRACT

A printing method includes obtaining an initial printer profile corresponding to a printing system having a plurality of ink colors, identifying a remaining ink parameter corresponding to each of the ink colors, and determining whether the remaining ink parameter of each of the ink colors are approximately equal to each other such that: performing a print job using the initial printer profile when the remaining ink parameter determination is that the remaining ink parameter of each of the ink colors are approximately equal to each other, and determining a modified printer profile by selectively changing color saturation for one or more of the ink colors to balance ink usage and performing the print job using the modified printer profile when the remaining ink parameter determination is that the remaining ink parameter of each of the ink colors are not approximately equal to each other.

15 Claims, 3 Drawing Sheets

(56) References Cited

U.S. PATENT DOCUMENTS

| | | | | |
|---|---|---|---|---|
| 5,886,273 | A | 3/1999 | Haruyama | |
| 5,982,351 | A | 11/1999 | White et al. | |
| 6,731,316 | B2 | 5/2004 | Herigstad et al. | |
| 7,982,907 | B2 * | 7/2011 | Hashimoto et al. | 358/1.9 |
| 8,446,602 | B2 * | 5/2013 | Harris et al. | 358/1.13 |
| 2002/0186262 | A1 | 12/2002 | Itavaara et al. | |
| 2003/0035537 | A1 | 2/2003 | Ghassabian | |
| 2006/0072170 | A1 * | 4/2006 | Kawakami et al. | 358/504 |
| 2006/0158673 | A1 * | 7/2006 | Gondek et al. | 358/1.13 |
| 2008/0184324 | A1 | 7/2008 | Yun et al. | |
| 2008/0301575 | A1 | 12/2008 | Fermon | |
| 2008/0303793 | A1 | 12/2008 | Carroll | |
| 2009/0051572 | A1 | 2/2009 | Yi et al. | |
| 2012/0086960 | A1 * | 4/2012 | Kawabe | 358/1.9 |

FOREIGN PATENT DOCUMENTS

| | | | |
|---|---|---|---|
| GB | 2422235 | A | 7/2006 |
| JP | 10-058753 | A | 3/1998 |
| JP | 2000-225720 | A | 8/2000 |
| JP | 2001-038929 | A | 2/2001 |
| KR | 10-0484155 | B1 | 4/2005 |

OTHER PUBLICATIONS

International Search Report and Written Opinion for PCT Application No. PCT/US2009/042302, mailed Oct. 30, 2009, pp. 10.

* cited by examiner

DETERMINE MODIFIED PRINTER PROFILE BY SELECTIVELY CHANGING COLOR SATURATION TO BALANCE INK USAGE

BACKGROUND

Printing systems are capable of printing images on print media in a variety of colors. Inkjet printers can use a multi-chambered ink cartridge in which each chamber contains a different color ink such as cyan, magenta and yellow. The ink cartridge can be embodied in a replaceable ink cartridge. Thus, when one of the ink colors in the respective chamber of the ink cartridge is depleted, the ink cartridge would need to be replaced in order to continue to print images.

BRIEF DESCRIPTION OF THE DRAWINGS

Exemplary non-limiting embodiments of the general inventive concept are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Printing systems such as inkjet printers use replaceable multi-chambered ink cartridges in which each chamber contains a different color ink such as cyan, magenta and yellow. Generally, such multi-chambered ink cartridges enable a mechanically simpler and lower-cost product relative to printing systems with individual ink tanks for each color. When one of the ink colors in the respective chamber of the ink cartridge is depleted, however, the ink cartridge would need to be replaced. Replacement is necessary even when the other remaining ink colors are not depleted in order to continue to accurately print images. Such stranded ink also leads to wider variability in page yield and cost per page.

Figure 1:
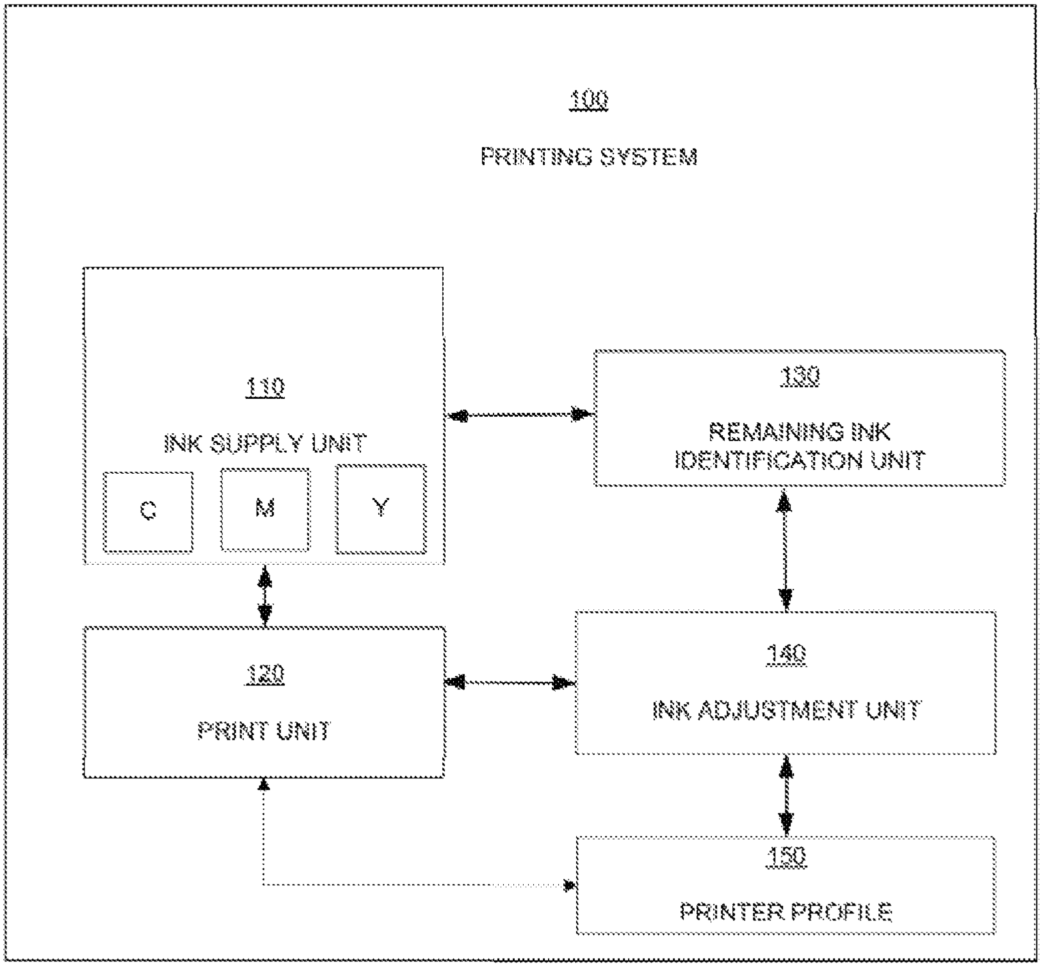
FIG. 1 is a block diagram of a printing system according to an exemplary embodiment of the present general inventive concept.

FIG. 1 is a block diagram of a printing system according to an exemplary embodiment of the present general inventive concept. Referring to FIG. 1, the printing system 100 includes an ink supply unit 110, a print unit 120, a remaining ink identification unit 130, an ink adjustment unit 140, and a printer profile 150. In the present embodiment, the printing system 100 is an inkjet printer. In other embodiments, the printing system 100 may be a digital copier, printer, bookmaking machine, facsimile machine, multi-function machine, or the like.

Referring to FIG. 1, the ink supply unit 110 is configured to supply ink of different colors to the print unit 120. The term ink is used generally herein, and encompasses any type of pigment or colorant such as toner, or other type of image forming material, and may be in a variety of forms such as liquid, semi-liquid, dry, powder, solid, semi-solid, or other forms, that is used in conjunction with printing systems to print images on print media. In the present embodiment, the ink supply unit 110 is a replaceable ink cartridge having a plurality of chambers to contain ink colors different from each other such as a replaceable tri-color ink cartridge. For example, as illustrated in FIG. 1, the ink supply unit 110 includes ink supplies of cyan C, magenta M, and yellow Y. The replaceable ink cartridge is removeably attached to the printing system 100 so that the ink cartridge can be replaced when ink is depleted. Although the ink colors are depicted as cyan C, magenta M, and yellow Y, in different embodiments the ink may include other colors, in addition to and/or in lieu of the ink colors illustrated in FIG. 1. For example, the ink supply unit 110 may optionally include an ink supply of black.

As illustrated in FIG. 1, the print unit 120 is configured to print on the print media, for example, by ejecting the different colored inks C, M, and Y provided by the ink supply unit 110 to form images on the print media. The images may include text, graphics, or a combination of text and graphics. The print unit 120 may include components needed to print onto the print media such as an inkjet printhead that is old and well-known in the art.

Referring to FIG. 1, the remaining ink identification unit 130 is configured to determine an ink remaining parameter corresponding to each ink color. In the present embodiment, the ink remaining parameter may be an amount of remaining ink color or a percentage of the amount of the remaining ink color with respect to an original amount of the respective ink color in the ink supply unit 110. For example, the original amount of the respective ink color is the actual amount of the respective ink color that was originally provided with a new replaceable ink cartridge. In one embodiment, the original amounts of each of the ink colors are approximately the same. In other embodiments, the original amounts of one or more of the ink colors are different from each other.

In the present embodiment, the remaining ink identification unit 130 includes sensors configured to sense and measure an actual amount of each ink color remaining in the ink supply unit 110. In other embodiments, the remaining ink identification unit 130 is configured to estimate an amount of remaining ink, for example, by counting a number of ink drops produced, measuring an amount of time a respective ink color has been used, and/or any other well-known device and/or method to determine the amount of remaining ink in the ink supply unit 110. The remaining ink identification unit 130, for example, may also determine the percentage of the amount of the remaining ink color with respect to the original amount of the respective ink color in the ink supply unit 110. The remaining ink identification unit 130 may be implemented in hardware, software, or in a combination of hardware and software.

In the present embodiment, the printer profile 150 is a data structure configured to enumerate characteristics of the printing system 100 as illustrated in FIG. 1. The printer profile 150 may be stored on the printing system 100 either locally and/or remotely such as on a printer server or other location of the printing system 100. The printer profile 150 may include one or more color maps, for example, which may be obtained from a manufacturer or based on product model. A color map generally is a table that defines a relationship between different sets of colors, for example, from different devices and an amount of each ink color to be used. The print unit 120 uses the printer profile 150 in order to print images on the print media.

As illustrated in FIG. 1, the printing system 100 includes the ink adjustment unit 140 configured to adjust or balance ink usage so that, for example, the different ink colors approximately run out at the same time, according to an embodiment of the present general inventive concept. The ink usage in the printing of the images is balanced in a manner which does not noticeably degrade an appearance of the images. For example, color saturation is selectively decreased and/or increased while preserving a gray component in which a maximal amount of visual information and intent of the printed images are retained. The ink adjustment unit 140 may be implemented in hardware, software, or in a combination of hardware and software. In other embodiments, the ink adjustment unit 140 may be implemented in whole or in part as a computer program stored in the printing system 100 locally or remotely, for example, in a printer server or a host computing device considered herein to be part of the printing system 100.

In the present embodiment, the ink adjustment unit 140 modifies the printer profile 150 by modifying one or more color maps thereof before each new print job based on amounts of ink color remaining in the ink supply unit 110. A print job generally includes one or more digital "pages" to be rendered as one or more copies on a set of associated sheets of print media, each page, when rendered, constituting a front or back side of a sheet. In a case of the print media being in a form of a web, a portion of the web would correspond to the sheet of sheet-fed print media. The pages of a print job may arrive from a common source and, when rendered, be assembled at a common output destination. The remaining ink identification unit 130 communicates with the ink supply unit 110 to identify, for example, the remaining ink parameter corresponding to each of the ink colors C, M and Y.

For example, if the respective remaining ink parameters corresponds to a previous print job depleted a significant amount of yellow Y ink, the ink adjustment unit 140 impacts ink usage for future print jobs will rebalance to use less yellow Y ink and more cyan C and magenta M ink. However, if ink usage is attempted to be balanced by independently scaling the ink color channels without dealing with a contribution of the underlying gray component to the final color image that impacts color balance, tonality, and detail, the printed images can result in unacceptable color balance and hue-shift problems. Thus, in one embodiment, the ink adjustment unit 140 determines a modified printer profile by changing a value of one or more nodes of the initial printer profile corresponding to an amount of each of the ink colors to be used based on the respective node without changing a respective gray component of the respective node. For example, the ink adjustment unit 140 determines the modified printer profile by calculating an individual correction factor corresponding to each of the plurality of ink colors C, M and Y to increase or decrease an amount of the respective ink color to be used for the print job, and calculating a node correction factor for each node of the initial printer profile by linearly weighting the individual correction factors by a normalized value of the respective node that does not include the gray component of the respective node. In the present embodiment, amounts of the plurality of ink colors are normalized after removing the respective gray components before the amounts of the plurality of ink colors are used as a weighting factor to determine final correction factor.

In other embodiments, the ink adjustment unit 140 determines a modified printer profile by calculating the individual correction factor corresponding to each of the plurality of ink colors C, M and Y to increase or decrease the amount of the respective ink color to be used for the print job, calculating a second normalized value for each node in the initial printer profile by subtracting a respective gray component from a respective first value of the respective node such that the respective first value corresponds to an amount of each ink color to be used based on the respective node, calculating the node correction factor for the each node by linearly weighting the individual correction factors by the respective second normalized value of the respective node, calculating a third value for the each node by multiplying the respective second normalized value by the respective node correction factor of the respective node, and calculating a fourth value for the each node by adding the respective gray component back to the respective third value of the respective node. The ink adjustment unit 140 may create the modified printer profile by changing the first value to the fourth value for each of the respective nodes in the initial printer profile.

Referring to FIG. 1, in the present embodiment, the printing system 100 includes an ink supply unit 110 having a plurality of ink colors C, M and Y, a remaining ink identification unit 130 configured to identify a remaining ink parameter for each of the ink colors C, M, and Y of the ink supply unit 110, a print unit 120 configured to print on print media with one or more of the ink colors C, M, and Y, a printer profile 150 configured to enumerate characteristics of the printing system 100 including an amount of each of the ink colors C, M, and Y to be used by the print unit 120 to print on the print media, and an ink adjustment unit 140 configured to modify the printer profile 150 in response to the remaining ink parameter for each of the ink colors C, M, and Y identified by the remaining ink identification unit 130 by selectively changing color saturation for one or more of the ink colors C, M, and Y to balance ink usage. In one embodiment, the ink adjustment unit 140 determines the modified printer profile without changing a gray component corresponding to each node of the initial printer profile. In another embodiment, a same total amount of ink is used whether the printing is performed using the modified printer profile or the initial printer profile. In other embodiments, the ink adjustment unit 140 does not affect an overall ink per page, but shifts usage between ink colors to normalize depletion of each of the ink colors C, M and Y without changing an overall amount of ink per page.

In the present embodiment, the ink adjustment unit 140 is configured to modify the initial printer profile when the remaining ink parameter for each of the ink colors C, M and Y are not approximately equal to each other. In another embodiment, the ink adjustment unit 140 is configured to modify the initial printer profile when the remaining ink parameter for each of the ink colors C, M and Y are within a predetermined range of 0 to 97% from each other. That is, in this embodiment, when the remaining ink parameter for each of the ink colors C, M and Y are within a predetermined range of greater than 97% from each other, the initial printer profile is not modified.

In the present embodiment, the ink adjustment unit 140 can modify the printer profile 150 independent of a specific printing system, and independent of a manner in which a given printing system actually converts, for example, red, green, and blue values of an image on a display to cyan C, magenta M, and yellow Y to be printed by the respective printing system.

Figure 2:
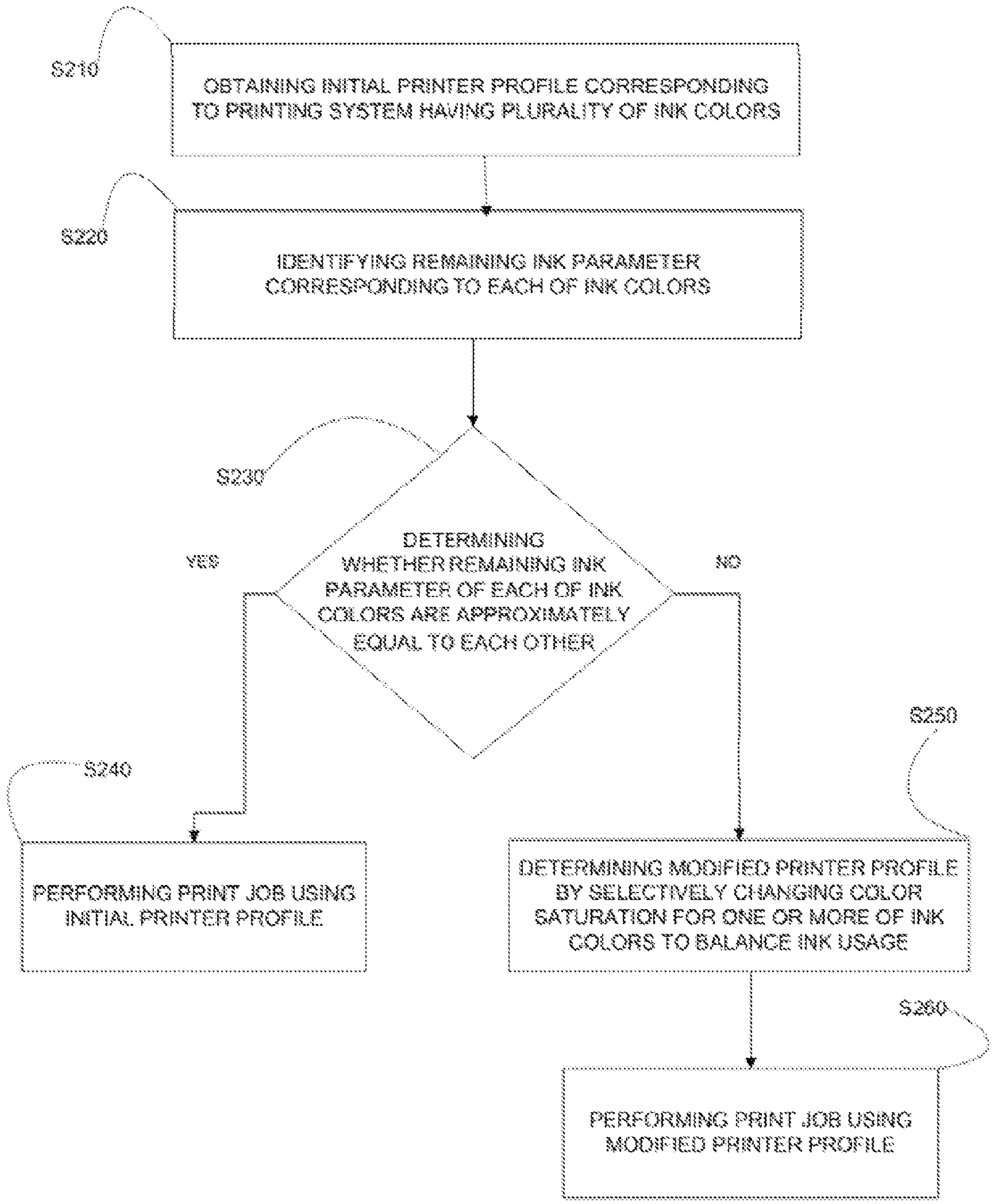
FIG. 2 is a flowchart illustrating a printing method according to an embodiment of the present general inventive concept.

FIG. 2 is a flowchart illustrating a printing method according to an embodiment of the present general inventive concept. Referring to FIGS. 1 and 2, in operation S210, an initial printer profile is obtained corresponding to a printing system 100 having a plurality of ink colors C, M and Y. In operation S220, a remaining ink parameter corresponding to each of the ink colors C, M and Y is identified. In operation S230, a determination is made whether the remaining ink parameter of each of the ink colors C, M and Y are approximately equal to each other. If so, in operation S240, a print job using the initial printer profile is performed. If not, in operation S250, a modified printer profile is determined by selectively changing color saturation for one or more of the ink colors C, M and Y to balance ink usage and, in operation S260, the print job using the modified printer profile is performed. In the present embodiment, the remaining ink parameter is at least one of an amount of remaining ink color and a percentage of the amount of the remaining ink color with respect to an original amount of the respective ink color.

In one embodiment, the modified printer profile is determined without changing a gray component corresponding to each node of the initial printer profile. In another embodiment, a same total amount of ink is used whether the printing is performed using the modified printer profile or the initial printer profile. In other embodiments, the modified printer profile is determined by changing a value of one or more nodes of the initial printer profile corresponding to an amount of each of the ink colors C, M and Y to be used based on the respective node without changing a respective gray component of the respective node.

In the present embodiment, the modified printer profile is determined by calculating an individual correction factor corresponding to each of the plurality of ink colors C, M and Y to increase or decrease an amount of the respective ink color to be used for the print job, and calculating a node correction factor for each node of the initial printer profile by linearly weighting the individual correction factors by a normalized value of the respective node that does not include a gray component of the respective node.

In other embodiments, the modified printer profile is determined when the remaining ink parameter for each of the ink colors C, M and Y are within a predetermined range of 0 to 97% from each other. That is, in this embodiment, when the remaining ink parameter for each of the ink colors C, M and Y are within a predetermined range of greater than 97% from each other, the initial printer profile is not modified.

In the present embodiment, the printer profile 150 can be modified independent of a specific printing system, and independent of a manner in which a given printing system actually converts, for example, red, green, and blue values of an image on a display to cyan C, magenta M, and yellow Y to be printed by the respective printing system. In the present embodiment, the printing method is performed prior to performing a subsequent print job.

Figure 3:
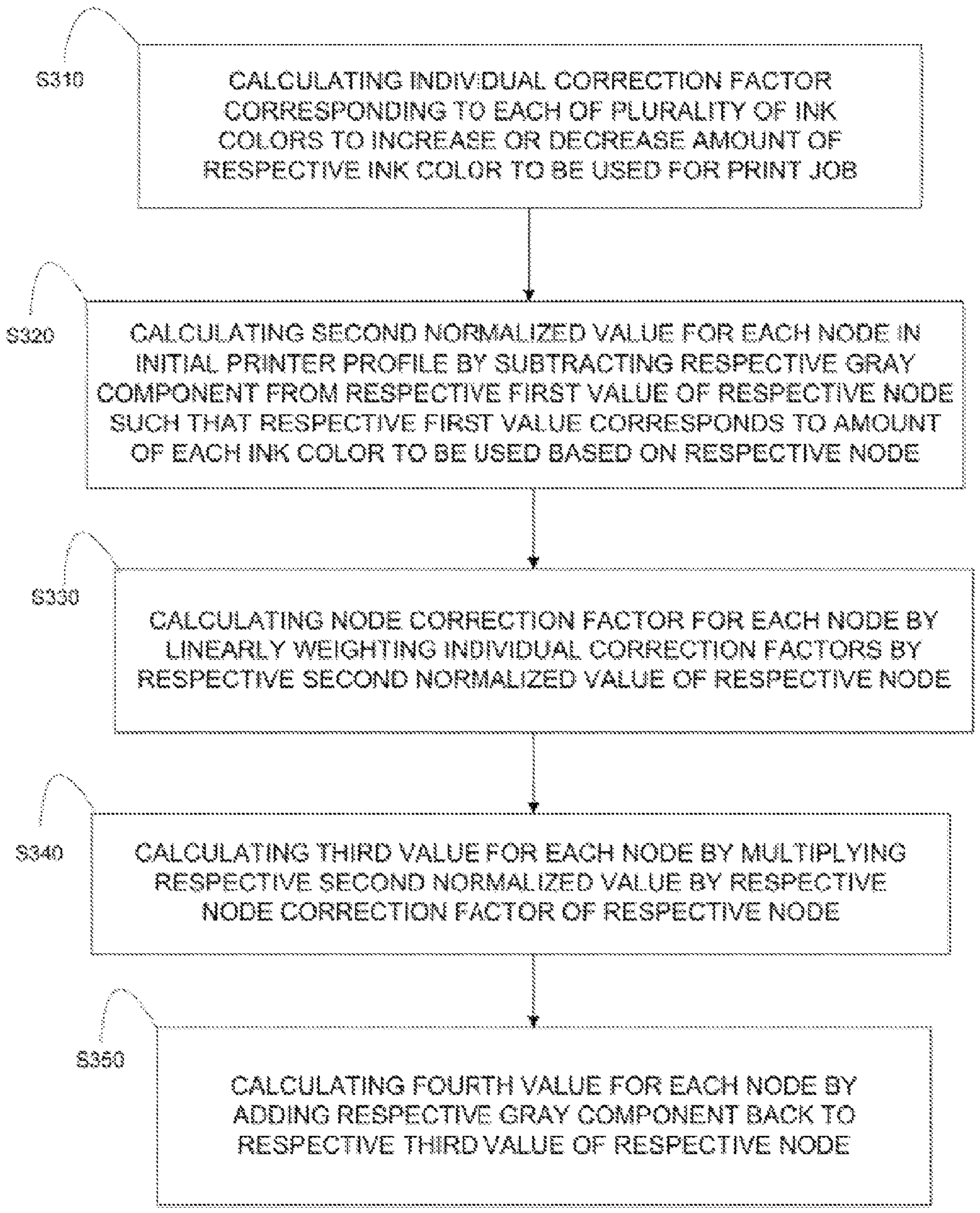
FIG. 3 is a flowchart of a method of determining a modified printer profile by selectively changing color saturation for one or more of the ink colors to balance ink usage according to an embodiment of the present general inventive concept.

FIG. 3 is a flowchart of a method of determining a modified printer profile by selectively changing color saturation for one or more of the ink colors C, M and Y to balance ink usage according to an embodiment of the present general inventive concept. Referring to FIGS. 1 and 3, in operation S310, an individual correction factor is calculated corresponding to each of the plurality of ink colors C, M and Y to increase or decrease an amount of the respective ink color to be used for the print job. In operation S320, a second normalized value is calculated for each node in the initial printer profile by subtracting a respective gray component from a respective first value of the respective node such that the respective first value corresponds to an amount of each ink color C, M and Y to be used based on the respective node. In operation S330, a node correction factor is calculated for the each node by linearly weighting the individual correction factors by the respective second normalized value of the respective node. In operation S340, a third value is calculated for the each node by multiplying the respective second normalized value by the respective node correction factor of the respective node. In operation S350, a fourth value is calculated for the each node by adding the respective gray component back to the respective third value of the respective node. Further, the modified printer profile may be created by changing the first value to the fourth value for each of the respective nodes in the initial printer profile.

It is to be understood that the flowcharts of FIGS. 2 and 3 illustrate an architecture, functionality, and operation of exemplary embodiments of the present general inventive concept. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowcharts of FIGS. 2 and 3 illustrate a specific order of execution, the order of execution may differ from that which is depicted. For example, the order of execution of two or more blocks may be scrambled relative to the order illustrated. Also, two or more blocks illustrated in succession in FIGS. 2 and 3 may be executed concurrently or with partial concurrence. All such variations are within the scope of the present general inventive concept.

Also, the present general inventive concept can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "computer-readable medium" can be any means that can store, communicate, propagate or transport a program for use by or in connection with the instruction-execution system, apparatus or device. The computer-readable medium can include any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc. It is to be understood that the computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiment of the present general inventive concept can be implemented in hardware, software, firmware or combinations thereof. Separate embodiments of the present general inventive concept can be implemented using a combination of hardware and software or firmware that is stored in memory and executed by a suitable instruction-execution system. If implemented solely in hardware, as in an alternative embodiment, the present general inventive concept can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In other embodiments, the present general inventive concept can be implemented in a combination of software and data executed and stored under the control of a computing device.

Once given the above disclosure, many other features, modifications or improvements will become apparent to the skilled artisan. Such features, modifications or improvements are, therefore, considered to be a part of the general inventive concept, the scope of which is to be determined by the following claims.

What is claimed is:

1. A printing method, comprising:

obtaining an initial printer profile corresponding to a printing system having a plurality of ink colors;

identifying a remaining ink parameter corresponding to each of the ink colors; and determining whether the remaining ink parameter of each of the ink colors are approximately equal to each other such that:

performing a print job using the initial printer profile when the remaining ink parameter determination is that the remaining ink parameter of each of the ink colors are approximately equal to each other; and determining a modified printer profile by selectively changing color saturation for one or more of the ink colors to balance ink usage and performing the print job using the modified printer profile when the remaining ink parameter determination is that the remaining ink parameter of each of the ink colors are not approximately equal to each other, wherein a same total amount of ink is used whether the printing is performed using the modified printer profile or the initial printer profile.

2. The printing method according to claim 1, wherein the remaining ink parameter is at least one of an amount of remaining ink color and a percentage of the amount of the remaining ink color with respect to an original amount of the respective ink color.

3. The printing method according to claim 1, wherein the modified printer profile is determined without changing a gray component corresponding to each node of the initial printer profile.

4. The printing method according to claim 1, wherein determining a modified printer profile comprises:

changing a value of one or more nodes of the initial printer profile corresponding to an amount of each of the ink colors to be used based on the respective node without changing a respective gray component of the respective node.

5. The printing method according to claim 1, wherein determining a modified printer profile comprises:

calculating an individual correction factor corresponding to each of the plurality of ink colors to increase or decrease an amount of the respective ink color to be used for the print job; and calculating a node correction factor for each node of the initial printer profile by linearly weighting the individual correction factors by a normalized value of the respective node that does not include a gray component of the respective node.

6. The printing method according to claim 1, wherein determining a modified printer profile comprises:

calculating an individual correction factor corresponding to each of the plurality of ink colors to increase or decrease an amount of the respective ink color to be used for the print job;

calculating a second normalized value for each node in the initial printer profile by subtracting a respective gray component from a respective first value of the respective node, the respective first value corresponding to an amount of each ink color to be used based on the respective node;

calculating a node correction factor for the each node by linearly weighting the individual correction factors by the respective second normalized value of the respective node;

calculating a third value for the each node by multiplying the respective second normalized value by the respective node correction factor of the respective node; and calculating a fourth value for the each node by adding the respective gray component back to the respective third value of the respective node.

7. The printing method according to claim 6, wherein determining a modified printer profile further comprises:

creating the modified printer profile by changing the first value to the fourth value for each of the respective nodes in the initial printer profile.

8. The printing method according to claim 1, wherein the printing system is an inkjet printer, the plurality of ink colors are included in a replaceable tri-color ink cartridge, and the plurality of ink colors are cyan, magenta and yellow.

9. A printing system, comprising:

an ink supply unit having a plurality of ink colors;

a remaining ink identification unit configured to identify a remaining ink parameter for each of the ink colors of the ink supply unit;

a print unit configured to print on print media with one or more of the ink colors;

a printer profile configured to enumerate characteristics of the printing system including an amount of each of the ink colors to be used by the print unit to print on the print media; and an ink adjustment unit configured to modify the printer profile in response to the remaining ink parameter for each of the ink colors identified by the remaining ink identification unit by selectively changing color saturation for one or more of the ink colors to balance ink usage, the ink adjustment unit to calculate an individual correction factor corresponding to each of the plurality of ink colors to increase or decrease an amount of the respective ink color to be used for the print job, and to calculate a node correction factor for each node of an initial printer profile by linearly weighting the individual correction factors by a normalized value of the respective node that does not include a gray component of the respective node.

10. The printing system according to claim 9, wherein the remaining ink parameter is at least one of an amount of remaining ink color and a percentage of the amount of the remaining ink color with respect to an original amount of the respective ink color.

11. The printing system according to claim 10, wherein the printing system is an inkjet printer, the ink supply unit is a replaceable tri-color ink cartridge, and the plurality of ink colors are cyan, magenta and yellow.

12. A non-transitory computer-readable medium having embodied thereon a computer program to execute a method, wherein the method comprises:

obtaining an initial printer profile corresponding to a printing system having a plurality of ink colors;

identifying a remaining ink parameter corresponding to each of the ink colors; and determining whether the remaining ink parameter of each of the ink colors are approximately equal to each other such that:

performing a print job using the initial printer profile when the remaining ink parameter determination is that the remaining ink parameter of each of the ink colors are approximately equal to each other; and determining a modified printer profile by selectively changing color saturation for one or more of the ink colors to balance ink usage and performing the print job using the modified printer profile when the remaining ink parameter determination is that the remaining ink parameter of each of the ink colors are not approximately equal to each other, wherein determining the modified printer profile comprises:

calculating an individual correction factor corresponding to each of the ink colors to increase or decrease an amount of the respective ink color to be used for the print job; and calculating a node correction factor for each node of the initial printer profile by linearly weighting the individual correction factors by a normalized value of the respective node that does not include a gray component of the respective node.

13. The medium according to claim 12, wherein the remaining ink parameter is at least one of an amount of remaining ink color and a percentage of the amount of the remaining ink color with respect to an original amount of the respective ink color.

14. The medium according to claim 13, wherein the printing system is an inkjet printer, the plurality of ink colors are included in a replaceable tri-color ink cartridge, and the plurality of ink colors are cyan, magenta and yellow.

15. The medium according to claim 12, wherein a same total amount of ink is used whether the printing is performed using the modified printer profile or the initial printer profile.

* * * * *